March 22, 1949.                 J. H. ROUSE                 2,464,945
CONTROL SYSTEM FOR FLUID PRESSURE SERVOMOTORS
Filed July 18, 1947                                 2 Sheets—Sheet 1
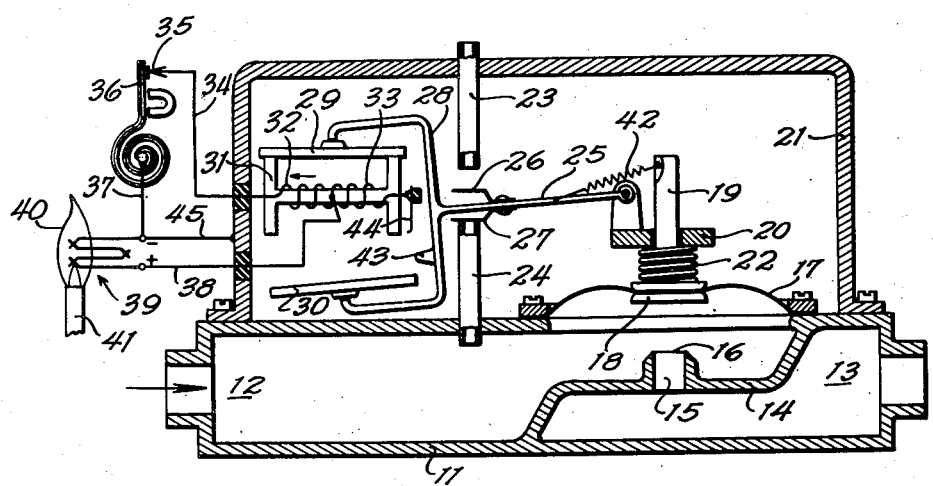
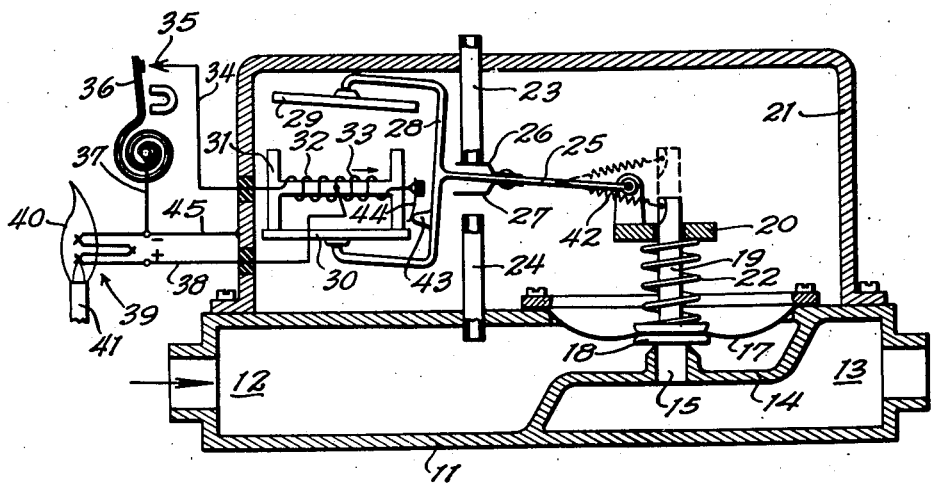
Inventor
John H. Rouse March 22, 1949. J. H. ROUSE 2,464,945
CONTROL SYSTEM FOR FLUID PRESSURE SERVOMOTORS
Filed July 18, 1947 2 Sheets-Sheet 2

Inventor
John H. Rouse.

Patented Mar. 22, 1949

2,464,945

UNITED STATES PATENT OFFICE 2,464,945

CONTROL SYSTEM FOR FLUID PRESSURE SERVOMOTORS

John H. Rouse, Los Angeles, Calif.

Application July 18, 1947, Serial No. 761,837

7 Claims. (Cl. 121—38)

This invention relates to improvements in motor-control systems of the character described and claimed in my copending application Serial No. 572,399 filed January 11, 1945 and issued August 5, 1947 as Patent No. 2,425,007.

The invention disclosed in said application and patent relates to a control system for fluid pressure servo-motor, such as those of the fluid-pressure-operated or electrically-operated type, wherein the device for controlling the motor is, respectively, a pilot valve or a switch; the main feature of that invention residing in an arrangement whereby it is only necessary to hold or latch the control device (pilot valve or switch) in its controlling positions, the power for actually moving the control device being derived from the same source of energy which supplies the motor. The power required for releasably-holding the control device is obviously less than would be required to move it, and that is an important factor when only a weak source of controlling energy is available; as, for example, if that source is a thermoelectric generating device of a size adapted to be heated by an ordinary pilot-burner flame.

It is an object of the present invention to provide improved electric and magnetic circuits particularly adapted for use in a control system of the character described above.

For full understanding of the invention, and appreciation of its features and advantages, reference is to be had to the following detailed description and accompanying drawing, and to the appended claims.

In the drawing:

Figures 1 and 2 are similar schematic views of a pilot-valve-controlled fluid-pressure-operated valve and control system embodying features of the present invention, the parts being shown in the figures in different positions assumed in operation;

Figure 3:
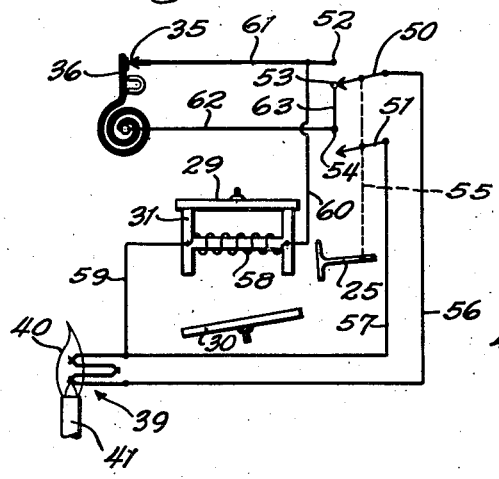
Figures 3 and 4 are diagrams of a modified electric control circuit for the valve of Figs. 1-2, the control elements being shown in Figs. 3-4 in the same relative positions as in Figs. 1-2.

Referring first to Figs. 1 and 2, the numeral 11 indicates a valve casing having an inlet 12 and an outlet 13 separated by a partition 14 having a port 15 around the upper end of which is a valve seat 16. Covering an opening in the top wall of the casing, and secured thereto at its margin, is a flexible diaphragm 17 which carries a closure 18, cooperable with seat 16, and a stem 19 which extends upwardly through an opening in a guide bracket 20 attached to the back wall of a metallic housing 21 mounted on top of the valve casing and defining therewith a pressure chamber. Biasing closure 18 downwardly is a compression spring 22.

Within the chamber defined by housing 21 is a three-way pilot valve comprising a pair of pipes 23 and 24, which lead respectively to the atmosphere and to the inlet of the valve, and a cooperating closure arm 25. This arm is pivoted at one end on an extension of the bracket 20 and carries a pair of resilient blade-like closures 26 and 27 which cooperate with the respective inner ends of pipes 23 and 24.

The arm 25 has at its free end a C-shaped extension 28 which carries a pair of armatures 29 and 30. These armatures cooperate respectively with the top and bottom ends, or polar areas, of an H-shaped electromagnet core 31 which is fixed with respect to housing 21. For energizing the core 31 there is a pair of interconnected coils 32 and 33, both of the coils being wound in the same direction. The free end of coil 32 is connected by a wire 34 to the fixed contact 35 of a bimetallic thermostat 36. Connected to the thermostat and to the inner end of coil 32, by wires 37 and 38, is a thermoelectric generating device 39 comprising a pair of thermocouples whose hot junctions are subjected to the flame 40 of a gas burner 41. When thermostat 36 is closed, as shown in Fig. 1, current flows from the bottom terminal of the source 39 through wire 38, coil 32 (in the direction of the arrow in Fig. 1), wire 34, contact 35, thermostat 36, and wire 37 to the top terminal of the source. When the parts are in the positions shown in Fig. 1, substantially all of the magnetic flux produced by the flow of current through coil 32 passes through the upper portion of the core 31 and through the armature 29; the arm 25 thus being magnetically held in the position shown (pilot closure 27 then being in tight engagement with pipe 24) against the force of a tension spring 42 connected between the arm and the main-closure stem 19.

When the thermostat 36 opens, the armature 29 is released and the arm 25 instantly snaps to the position shown in Fig. 2 wherein the armature 30 is in engagement with the bottom end or polar area of core 31. In this movement of the arm, a projection 43 on the C-shaped portion of the arm engages a switch blade 44 insulatingly mounted on the housing 21. This blade is connected to the outer end of coil 33 so that an energizing circuit for this coil is formed by the blade, projection 43, arm 25, bracket 20, housing 21, and a wire 45 which connects the upper terminal of source 39 to the housing; current flowing from the lower terminal of the source and wire 38 in the circuit described, the flow through coil 33 being in the direction of the arrow in Fig. 2. Substantially all of the magnetic flux now produced in the core 31 passes through the armature 30 so that the arm is magnetically held in its moved position.

With arm 25 in the position shown in Fig. 2, pipe 24 is uncovered and pipe 23 closed by closure 26 so that the fluid from the inlet of the valve casing flows through pipe 24 into the chamber above the diaphragm and, since it can no longer escape therefrom due to the closing of pipe 23, the fluid pressure above the diaphragm soon becomes the same as that below it and spring 22 is then effective to move the main closure 18 to its seated position as shown in Fig. 2. In this movement of the main closure, the right-hand end of spring 42 is lowered from its previous position (shown in broken lines in Fig. 2) so that the force of this spring now acts downwardly on arm 25.

When thermostat 36 recloses, current flows through both of coils 32 and 33, and since the magnetic flux produced by one coil bucks that produced by the other, the core 31 is deenergized so that the armature 30 is released and arm 25 snaps downwardly under the force of spring 42 to the position shown in Fig. 1. In this downward movement of the arm, the switch projection 43 is disengaged from the blade 44 so that the circuit of coil 33 is opened and current flow through coil 32 effects holding of armature 29 in engagement with the top end or polar area of the core.

With the arm 25 in the position shown in Fig. 1, the pipe 23 is uncovered and pipe 24 closed. Due to the resultant venting of the chamber above the diaphragm, the fluid pressure below the diaphragm becomes effective to move it upwardly to the position shown in Fig. 1, so that the position of spring 42 is again altered to condition arm 25 for return movement when armature 29 is subsequently released upon opening of the thermostat. It is thus seen that spring 42 supplies all of the energy for moving arm 25, and it is therefore only necessary to releasably hold the arm in its moved positions to effect the desired control of the valve.

To ensure operation of the control system even under pressure conditions such that the pressure-drop due to the opening of the main closure 18 would not permit sufficient rise of stem 19, a lost-motion connection may be provided between the diaphragm and the main closure, so that the spring bias of arm 25 is altered before the main closure opens. It is to be understood that the showing of Figs. 1 and 2 is strictly schematic, and that the movement of the parts is exaggerated for the sake of clarity.

Figure 4:
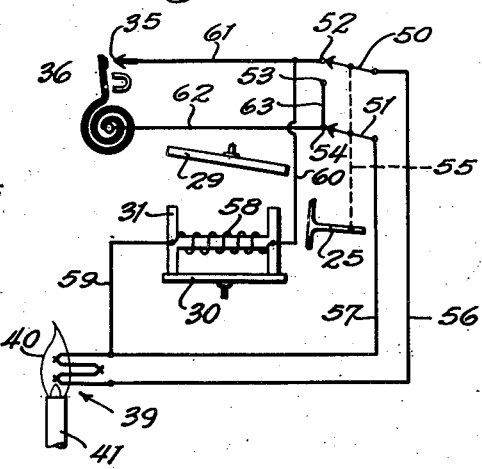

In Figs. 3 and 4 there is shown a modified circuit for controlling the valve of Figs. 1 and 2. For the sake of simplicity, only those parts of Figs. 1 and 2 essential to the understanding of the modified circuit are shown in Figs. 3 and 4. This modified circuit employs a switch comprising a pair of poles 50 and 51 cooperable, respectively, with fixed contacts 52—53 and fixed contact 54. As is indicated by the broken line 55, the switch is operatively connected to the control arm 25, and preferably includes snap-action means (not shown). The switch poles 50 and 51 are connected by wires 56 and 57 to the terminals of the source 39. The single energizing coil 58 for the core 31 is connected by wire 59 to the upper terminal of the source, and by wire 60 to another wire 61 which interconnects switch contact 52 and thermostat contact 35. The thermostat 36 is connected by a wire 62 to the switch contact 54, which contact is connected to contact 53 by a wire 63.

When the thermostat is closed, as shown in Fig. 3, the circuit for energizing the core to hold armature 29 can be traced as follows: from the lower terminal of source 39 through wire 56, switch pole 50, contact 53, wires 63 and 62, thermostat 36 and contact 35, wires 61 and 60, coil 58, and wire 59 to the upper terminal of the source. In Fig. 3, switch pole 51 is open. When the thermostat is open, as shown in Fig. 4, the circuit for energizing the core to hold armature 30 can be traced as follows: from the lower terminal of source 39 through wire 56, switch pole 50, contact 52, wires 61 and 60, coil 58, and wire 59 to the upper terminal of the source. In Fig. 4, switch pole 52 is in engagement with contact 54, but that contact is connected only to the open thermostat and to the open contact 53.

When the parts are in the positions shown in Fig. 3, opening of the thermostat effects interruption of current flow through the coil and release of armature 29. When, with the parts in the positions as shown in Fig. 4, the thermostat closes, it forms a shunt across the source 39 by way of (branch 1) wire 61, contact 52, pole 50, and wire 56; and (branch 2) wire 62, contact 54, pole 51, and wire 57; as well as a shunt across the coil which is connected to points on the respective branches by wires 60 and 59—the coil therefore being deenergized so that armature 30 is released.

While substantially the same results can be accomplished by the control systems of Figs. 1–2 and Figs. 3–4, the system of Figs. 1–2 has the advantage that the coils 32 and 33 or their circuits can be so proportioned or arranged as to produce equal magnetic effects when the thermostat is at a considerable distance from the valve and the resistance of the lines or wires 34 and 37 relatively high. Further, due to the inductance of the coils 32 and 33, an inductive effect is momentarily produced, upon closing of the thermostat, which ensures prompt release of the armature 30. In both of these systems, the selective control is effected by a simple open-closed or "two-wire" thermostat, in place of the "three-wire" thermostat required in the system shown in Figs. 1–2 of said copending application.

Figure 5:
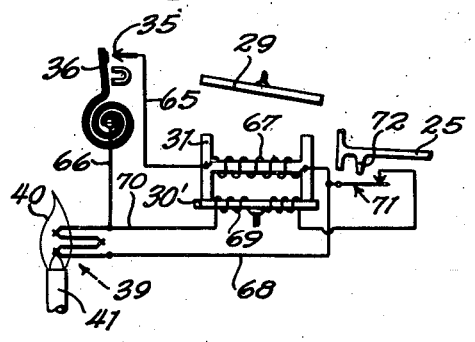
Figure 5 is a diagram of another control circuit for the valve.

In the further-modified system shown in Fig. 5 for controlling the valve of Figs. 1 and 2, energization of the core 31 is controlled solely by the thermostat which is connected by wires 65 and 66 respectively to one terminal of the coil 67 and one terminal of the source 39, the other terminals of these elements being interconnected by a wire 68. By closing or opening the thermostat, the armature 29 can be held or released. When the thermostat is open, the arm 25 is held in the position shown in Fig. 5 due to flow of current through a coil 69 wound around a bar 30' (corresponding to the armature 30 of Figs. 1–4), which coil constitutes the bar an electromagnet. The coil 69 is connected at one of its ends by a wire 70 to one terminal of source 39, and at its other end through a normally-closed switch 71 and the wire 68 to the other terminal of the source. When, with the parts in the positions shown in Fig. 5, the thermostat closes, the flow of current through coil 67 produces in core 31 a magnetic effect equal and opposed to that produced in the bar 30' by the current flowing through coil 69, so that the bar is released. In the resultant downward movement of the control arm 25, the switch 71 is forced open by a projection 72 on the arm. If the capacity of the source 39 is sufficient for supply of energy to both of the coils, the switch 71 may be eliminated and the coil 69 connected permanently across the source. However, the arrangement shown has the advantage that the source is then required to supply energy only momentarily to both coils, and the release of bar 30' is ensured even if the source is relatively weak, since the amount of current flowing momentarily through both of the coils is equally reduced.

It will be observed that, in the systems disclosed in Figs. 1–5, if the source of electric energy were to fail, the arm 25 would not be held in either of its controlling positions so that constant oscillation of the parts would occur, since as soon as the control arm were released from one position, pressure conditions would then be established effective to move the stem 19 to a position wherein the spring 42 would be effective to return the arm to its previous position. It is therefore necessary when, for example, the valve is employed for controlling supply of fuel-gas to the main burner of a furnace and the burner 41 serves as the pilot burner, to provide means for obstructing the fuel supply upon failure of the electric source, such as a safety shut-off valve connected ahead of the main-burner valve and responsive to the flame of burner 41, or the safety latching means disclosed in Figs. 1 and 2 of said patent granted on the copending application.

As is disclosed in Figs 3 and 4 of said copending application, the parts can be maintained in a selected position, notwithstanding failure of the electric source, if a permanent magnet is substituted for the electromagnet in Fig. 5 constituted by bar 30' and coil 69; that electromagnet being, in effect, a "permanent" magnet if it is permanently connected to an electric source. If a permanent magnet were substituted in the manner described in the system of Fig. 5, upon failure of the source (or opening of the thermostat) the control arm would be held by the permanent magnet when the arm reached the position shown in that figure, and in which position the main closure 18 is seated so that the valve "fails safe."

It is obviously essential that the holding force of the permanent magnet be substantially equal to the holding force exerted on armature 29 by the electromagnet of Fig. 5 constituted by core 31 and coil 67, and, further, that when said electromagnet is initially energized it should be capable of neutralizing the holding force of the permanent magnet to effect release of the same. However, when an ordinary permanent magnet, of bar type or U-shaped type, is employed, the electromagnet is incapable of neutralizing the force of such a permanent magnet when the holding forces of the electro- and permanent magnets are equal; this apparently being due to the fact that the high reluctance of the portion of the magnetic path formed by the permanent magnet prevents establishment of sufficient flux by the electromagnet.

Figure 6:
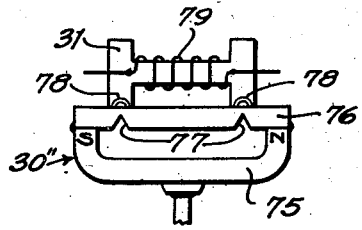
Figure 6 is a schematic view of a permanent-magnet unit adapted for use in a control system similar to that of Fig. 5.

In Fig. 6 there is shown a permanent-magnet unit whereby the desired results can be accomplished. This unit, generally indicated at 30", comprises a U-shaped part 75 of ordinary permanently-magnetized material which is mechanically secured to a bar 76 of material having low reluctivity, such as the material of which the core 31 is constructed. Cut in the bar 76, so as to coincide with the cooperating arms of the H-shaped core 31, is a pair of notches 77. In the absence of these notches or other form of opening in the bar 76, the difference of magnetic potential across the bar would normally be insufficient to effect magnetic holding of the permanent-magnet unit 30" in engagement with the unenergized core 31. But, due to the restrictions produced by the notches 77, there is leakage of magnetic flux adjacent the notches which links with the individual arms of the core, as indicated by the flux lines 78, to effect the desired magnetic holding.

Upon passage of current through the coil 79 (when the thermostat closes) the resultant "bucking" flux passes easily through the material of the bar 76 to effect neutralization of the flux leaking from the permanent-magnet unit 30", so that the same is released.

In the systems of Figs. 1–5, the switching means there shown as operated by movement of the control arm 25 could be arranged to be operated, instead, by the movement of the diaphragm-stem 19; conveniently, as through the "slip-clutch" arrangement commonly employed in oil-burner control systems, whereby the switching means would be operated by initial movement of the stem 19 in either direction before the bias of the control member (arm 25) were altered.

The embodiments of my invention herein shown and described are obviously susceptible of further modification without departing from the spirit of the invention, and I intend therefore to be limited only by the scope of the appended claims.

I claim as my invention:

1. In a control system: a member movable between opposite positions; means operated in response to movement of said member to either one of its positions for then biasing the member toward the opposite position; an electro-magnet effective, when energized, to hold the member in said positions against the force of said biasing means; means, comprising a selectively-operable switch, for energizing said electromagnet to hold the member in one of its positions; and means, comprising a switch operated in response to the movement of the member to the other of its positions, for energizing the electromagnet to hold the member in said other positions.

2. In a control system: a member movable between opposite positions; means operated in response to movement of said member to either one of its positions for then biasing the member toward the opposite position; an electromagnet effective, when energized, to hold the member in said positions against the force of said biasing means; and a pair of circuits for energizing said electromagnet; one of said circuits comprising a first switch, selectively operable, which when closed effects energization of the electromagnet to hold the member in one of its positions; the other of said circuits comprising a second switch operated to electromagnet-energizing position in response to the movement of the member, resulting from the opening of said first switch, to the other of its positions; said circuits being so arranged that while said second switch is in said energizing position, closing of said first switch effects deenergization of the electromagnet.

3. A control system as defined in claim 2, and wherein each of said pair of circuits comprises a coil for the electromagnet, said coils being arranged to produce respectively-opposite magnetic effects.

4. A control system as defined in claim 2, and wherein said electromagnet comprises a core having opposite polar areas, and said member comprises armature means cooperable with the individual polar areas when the member is in its opposite positions.

5. A control system as defined in claim 2, and wherein: said electromagnet comprises a core having opposite polar areas; said member comprises armature means cooperable with the individual polar areas when the member is in its opposite positions; and each of said pair of circuits comprises a coil for said core, said coils being arranged to produce respectively-opposite magnetic effects.

6. A control system as defined in claim 2, and wherein said electromagnet comprises a substantially H-shaped core, and said member comprises a pair of armatures adapted individually to bridge opposite ends of said core when the member is in its opposite positions.

7. A control system as defined in claim 2, and wherein: said electromagnet comprises a substantially H-shaped core; said member comprises a pair of armatures adapted individually to bridge opposite ends of said core when the member is in its opposite positions; and each of said pair of circuits comprises a coil for said core, said coils being arranged to produce respectively-opposite magnetic effects.

JOHN H. ROUSE.

No references cited.